United States Patent
Chatterjee et al.

(10) Patent No.: US 12,505,589 B2
(45) Date of Patent: Dec. 23, 2025

(54) SYSTEMS AND METHODS FOR AUTOMATIC IMAGE GENERATION

(71) Applicant: FMR LLC, Boston, MA (US)

(72) Inventors: Somak Chatterjee, Karnataka (IN); Soumick Sarker, West Bengal (IN); Amritha Karunanidhi, Telangana (IN); Abhijit Kumar Rai, Karnataka (IN); Pooja Patila, Karnataka (IN); Ishan Roy, Karnataka (IN)

(73) Assignee: FMR LLC, Boston, MA (US)

( * ) Notice: Subject to any disclaimer, the term of this patent is extended or adjusted under 35 U.S.C. 154(b) by 113 days.

(21) Appl. No.: 18/661,899

(22) Filed: May 13, 2024

(65) Prior Publication Data

US 2025/0349041 A1    Nov. 13, 2025

(51) Int. Cl.
*G06T 11/00* (2006.01)
*G06V 10/25* (2022.01)
(Continued)

(52) U.S. Cl.
CPC .............. *G06T 11/00* (2013.01); *G06V 10/25* (2022.01); *G06V 10/56* (2022.01); *G06V 10/761* (2022.01);
(Continued)

(58) Field of Classification Search
CPC ........ G06T 11/00; G06V 10/25; G06V 10/56; G06V 10/761; G06V 10/764; G06V 40/161; G06V 2201/07
See application file for complete search history.

(56) References Cited

U.S. PATENT DOCUMENTS

| | | | |
|---|---|---|---|
| 2024/0161258 A1* | 5/2024 | Maschmeyer | G06T 7/70 |
| 2024/0193821 A1* | 6/2024 | Denison | G06F 3/04845 |

(Continued)

FOREIGN PATENT DOCUMENTS

| | | |
|---|---|---|
| CN | 108564119 B | 6/2020 |
| CN | 111784592 A | 10/2020 |

OTHER PUBLICATIONS

Wu, X., Sun, K., Zhu, F., Zhao, R., & Li, H. (2023). Human preference score: Better aligning text-to-image models with human preference. In Proceedings of the IEEE/CVF International Conference on Computer Vision (pp. 2096-2105).*

(Continued)

*Primary Examiner* — Sarah Lhymn
(74) *Attorney, Agent, or Firm* — Cesari and McKenna, LLP (57) ABSTRACT

A computer-implemented method is provided for generating a digital image. The method includes inputting a prompt that provides a textual description of the image into a trained machine learning model to generate the image based on the prompt, and processing the image. Processing the image includes determining presence of one or more humans in the image by detecting one or more human faces using a face detection algorithm, if at least one human face is detected, which is indicative of at least one human present in the image, determining whether there is at least one anatomical deformity associated with the at least one human, and if at least one anatomical deformity is detected, performing correction of the at least one anatomical deformity. The method further includes grading, by the computing device, the image to generate a final score to evaluate image quality.

19 Claims, 4 Drawing Sheets

(51) Int. Cl.
*G06V 10/56* (2022.01)
*G06V 10/74* (2022.01)
*G06V 10/764* (2022.01)
*G06V 40/16* (2022.01)

(52) U.S. Cl.
CPC .......... *G06V 10/764* (2022.01); *G06V 40/161* (2022.01); *G06V 2201/07* (2022.01)

(56) References Cited

U.S. PATENT DOCUMENTS

| | | | | |
|---|---|---|---|---|
| 2024/0203005 | A1* | 6/2024 | Palangi | G06F 40/40 |
| 2024/0282016 | A1* | 8/2024 | Liu | G06Q 50/01 |
| 2024/0355065 | A1* | 10/2024 | Miller | G06T 19/006 |
| 2025/0022185 | A1* | 1/2025 | Mitchell | G06T 11/00 |
| 2025/0078336 | A1* | 3/2025 | Westcott | G06T 11/00 |
| 2025/0104290 | A1* | 3/2025 | Ding | G06V 10/44 |
| 2025/0111655 | A1* | 4/2025 | Povalyaev | G06T 11/00 |
| 2025/0166237 | A1* | 5/2025 | Zeng | G06T 7/70 |

OTHER PUBLICATIONS

Zhang, Y., Ma, S., Li, X., Ren, J., Sun, X., Zhong, Z., & Wang, J. (2024). Diffbody: Human body restoration by imagining with generative diffusion prior.*

"Apache License 2.0," Version 2.0, GPT2/License at master affjljoo3581/GPT2, GitHub, Retrieved from the Internet: <https://github.com/affjljoo3581/GPT2/blob/master/LICENSE>, Jan. 2004, pp. 1-5.

"Apache License, Version 2.0," The Apache Software Foundation, Version 2.0, Retrieved from the Internet: <https://www.apache.org/licenses/LICENSE-2.0>Jan. 2004, pp. 1-7.

"CC by 4.0 Attribution 4.0 International Deed," Creative Commons, Retrieved from the Internet:<https://creativecommons.org/licenses/by/4.0/>, Available from the Internet prior to May 13, 2024, pp. 1-6.

"GNU General Public License Version 3," yolov7/License.md at main WongKinYiu/yolov7, GitHub, Free Software Foundation, Inc., Retrieved from the Internet: <https://github.com/WongKinYiu/yolov7/blob/main/LICENSE.md>, Jun. 29, 2007, pp. 1-15.

Hastings, Larry, "big 0.11: pip install big," Big, Project Description, big PyPI, Python Software Foundation, Retrieved from the Internet: <https://pypi.org/project/big/>, Sep. 19, 2023, pp. 1-128.

"Laion Faq," Laion, Laion gemeinnütziger e.V., Retrieved from the Internet: <https://laion.ai/faq/>, Available from the Internet prior to May 13, 2024, pp. 1-2.

Mittal, Anish, et al., "No-reference Image Quality Assessment in the Spatial Domain," IEEE, IEEE Transactions on Image Processing, vol. 21, No. 12, Dec. 2012, pp. 4695-4708.

"SG161222/Paragon_V1.0," Inference API, Hugging Face, Retrieved from the Internet: <https://huggingface.co/SG161222/Paragon_V1.0>, Available from the Internet prior to May 13, 2024, pp. 1-7.

"SG161222/Realistic_Vision_V2.0," Hugging Face, Retrieved from the Internet: <https://huggingface.co/SG161222/Realistic_Vision_V2.0>, Available from the Internet prior to May 13, 2024, pp. 1-3.

Sandberg, David, "MIT License," facenet/License.md at master davidsandberg/facenet, GitHub, Retrieved from the Internet: <https://github.com/davidsandberg/facenet/blob/master/LICENSE.md>, 2016, pp. 1-2.

"S-Lab License 1.0," CodeFormer/License at master sczhou/CodeFormer, GitHub, S-Lab, Retrieved from the Internet: <https://github.com/sczhou/CodeFormer/blob/master/LICENSE>, 2022, pp. 1-2.

Zhang, Han, et al., "StackGAN++: Realistic Image Synthesis With Stacked Generative Adversarial Networks," arXiv, arXiv:1710.10916v3 [cs.CV], Jun. 28, 2018, pp. 1-16.

Zhang, Richard, et al., "BSD 2-Clause "Simplified" License," PerceptualSimilarity/License at master richzhang/PerceptualSimilarity, GitHub, Retrieved from the Internet: <https://github.com/richzhang/PerceptualSimilarity/blob/master/LICENSE>, 2018, pp. 1-2.

* cited by examiner

SYSTEMS AND METHODS FOR AUTOMATIC IMAGE GENERATION

BACKGROUND

Technical Field

This application generally relates to systems, methods and apparatuses, including computer program products, for automatically generating a digital image.

Background Information

Currently, to generate a digital banner, a content creator needs to find an actual desired image from a pool of existing images, create language content for the banner and assemble the banner with the select image and language content. The largely manual process is rather cumbersome and limiting as (i) selecting a desired image from a finite pool of existing images restricts creativity of the design team, (ii) searching through the image pool may be time consuming, and (iii) purchasing images for use are subject to costs usage limits. Therefore, there is a need for unrestricted automatic image and banner generation.

SUMMARY

The present invention features systems and method for using artificial intelligence (AI) to generate digital images of objects (both inanimate and animated), automatically correcting the AI-generated digital images in case of any deformities, ranking the images and integrating them in various digital banners for web and mobile sites. The process is modular in nature such that the image generation, alteration, ranking/grading and banner creation components are usable in various combinations or separately. In some embodiments, the AI-generated digital images do not belong to any real persons and/or location, and hence are royalty free and can be customized to suit a host of creatives without the need to purchase images. Overall, the ability to generate customized images increases creativity of the design teams. In addition, the ability to integrate these customized images in banner designs allows design teams to attempt multiple iterations and achieve faster compilation of creatives.

In one aspect, the present invention features a computer-implemented method for generating a digital image. The method includes inputting, by a computing device, a prompt that provides a textual description of the image into a trained machine learning model to generate the image based on the prompt. The method also includes processing, by the computing device, the image, which includes determining, by the computing device, presence of one or more humans in the image by detecting one or more human faces using a face detection algorithm. If at least one human face is detected, which is indicative of at least one human present in the image, the computing device determines whether there is at least one anatomical deformity associated with the at least one human. If at least one anatomical deformity is detected, the computing device performs correction of the at least one anatomical deformity by comparing the at least one anatomical deformity with a predefined limit and (i) discarding the image if the at least one deformity exceeds the limit, or (ii) automatically cropping the at least one anatomical deformity from the image if the at least one deformity is within the limit. The method further includes grading, by the computing device, the image to generate a final score based on a first score that measures a contextual similarity between the image and a reference image, a second score that measures a similarity in color gradients between the image and the reference image, and a third score that quantifies a quality of the image.

In another aspect, the present invention features a computer-implemented system for generating a digital image. The computer-implemented system comprising a computing device having a memory for storing instructions. The instructions, when executed, configure the computer-implemented system to provide an image generation module, a processing module and a benchmark module. The image generation module is configured to input a prompt that provides a textual description of the image into a trained machine learning model to generate the image based on the prompt. The processing module is configured to determine presence of one or more humans in the image by detecting one or more human faces using a face detection algorithm. If at least one human face is detected, which is indicative of at least one human present in the image, the processing module is configured to determine whether there is at least one anatomical deformity associated with the at least one human. If at least one anatomical deformity is detected, the processing module is configured to perform correction of the at least one anatomical deformity by comparing the at least one anatomical deformity with a predefined limit and (i) discarding the image if the at least one deformity exceeds the limit, or (ii) automatically cropping the at least one anatomical deformity from the image if the at least one deformity is within the limit. The benchmarking module is configured to grade the image to generate a final score based on a first score that measures a contextual similarity between the image and a reference image, a second score that measures a similarity in color gradients between the image and the reference image, and a third score that independently quantifies a quality of the image.

Any of the above aspects can include one or more of the following features. In some embodiments, the image is generated by the trained machine learning model using a stable diffusion pipeline.

In some embodiments, the anatomical deformity is present on a hand of the at least one human detected. In some embodiments, the anatomical deformity on the hand is detected by applying a trained machine-learning object detection model to detect the hand by generating a bounding box around a portion of the image that is the detected hand, and classifying the portion of the image in the bounding box to detect the at least one anatomical deformity. Classifying the portion of the image includes inputting the portion of the image in the bounding box to a convolutional neural network (CNN) trained for hand classification. In some embodiments, the anatomical deformity is cropped from the image by determining coordinates of the at least one deformity based on the bounding box, and if the coordinates of the anatomical deformity correlates to a height of the deformity of less than the predefined limit, cropping the anatomical deformity at the coordinates, obtaining a focus center of the human face in the image associated with the at least one anatomical deformity using the face detection algorithm, and pruning one or more sides of the image in proportion to a distance of the focus center from an actual image center to maintain image size proportions after the cropping. In some embodiments, the first score is generated by using a trained image captioning model to extract contexts of both the image and the reference image and using a cosine similarity technique to compare the extracted contexts. In some embodiments, the second score is generated by comparing pixel patches in both the image and the reference image to determine the similarity of the color gradients. In some embodiments, the third score is a Blind/Reference-less Image Spatial Quality Evaluator (BRISQUE) score generated using a BRISQUE algorithm based on pixel distributions of natural images following a Gaussian bell curve. In some embodiments, the final score is a weighted average of the first, second and third scores.

In some embodiments, multiple images are generated by inputting the same text prompt into the trained machine learning model. Each of the multiple images is processed to correct for any anatomical deformity. A plurality of final scores are generated for corresponding ones of the multiple images. A final image is then selected from the multiple images, where the final image has a highest final score from the plurality of final scores generated. In some embodiments, a digital banner is created that comprises selecting a type of the banner, configuring textual content of the banner, and configuring layout of the banner to include the final image selected.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
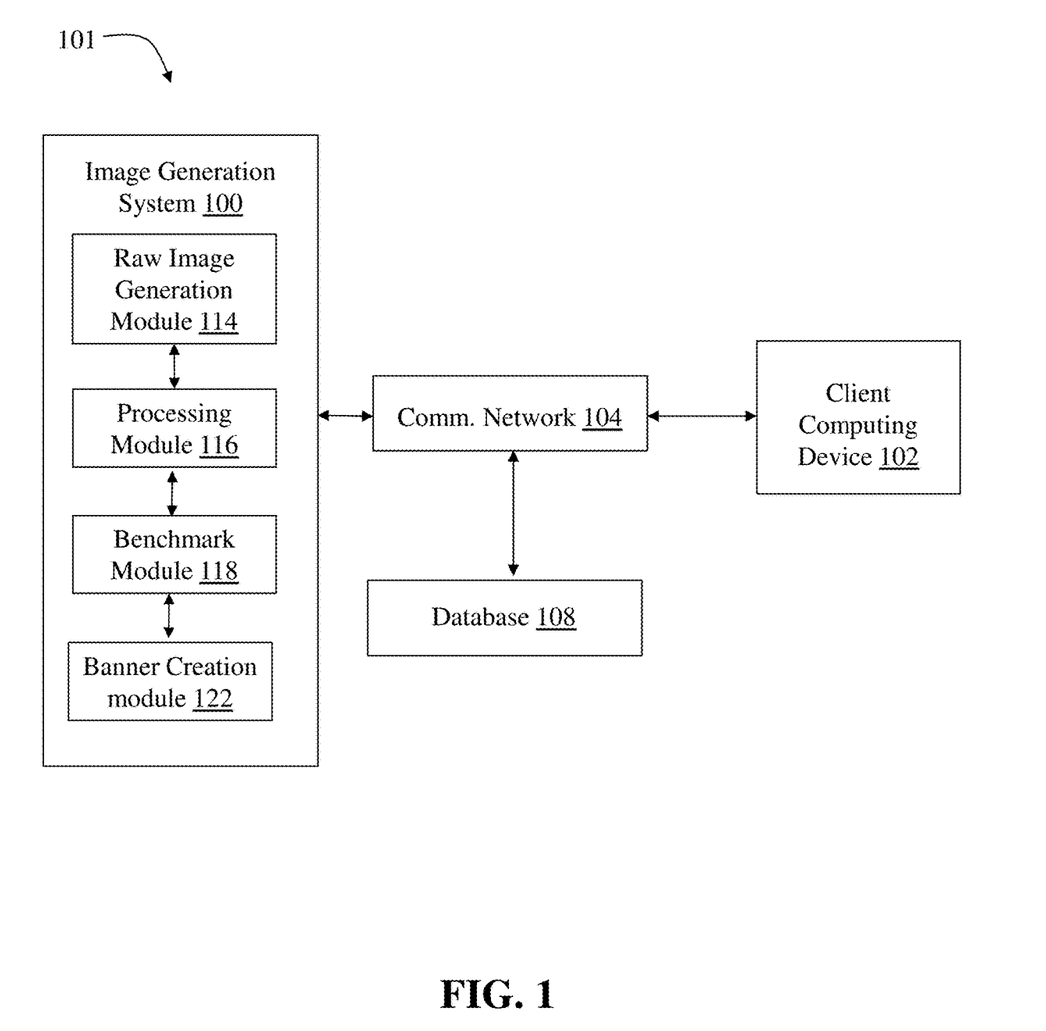
FIG. 1 shows an exemplary diagram of an image generation system, according to some embodiments of the present invention.

FIG. 1 shows an exemplary diagram of an image generation system 100 used in a computing environment 101 for automatically generating a digital image, according to some embodiments of the present invention. As shown, computing environment 101 generally includes at least one client computing device 102, a communication network 104, the image generation system 100, and at least one database 108.

The client computing device 102 can be associated with a user, such as a graphic designer, who would like to generate a customized digital image. The client computing device 102 can connect to the communication network 104 to interact with the image generation system 100 and/or the database 108 to provide inputs and receive outputs for display to the user. Exemplary computing devices 102 include, but are not limited to, telephones, desktop computers, laptop computers, tablets, mobile devices, smartphones, and internet appliances. It should be appreciated that other types of computing devices that are capable of connecting to the components of the computing environment 101 can be used without departing from the scope of invention. Although FIG. 1 depicts a single computing device 102, it should be appreciated that the computing environment 101 can include any number of client devices for communication by any number of users.

The communication network 104 enables components of the computing environment 101 to communicate with each other to perform the process of call agent evaluation. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The image generation system 100 is a combination of hardware, including one or more processors and one or more physical memory modules and specialized software engines that execute on the processor of the image generation system 100, to receive data from other components of the computing environment 101, transmit data to other components of the computing environment 101, and perform functions as described herein. As shown, the image generation system 100 executes a raw image generation module 114, a processing module 116, a benchmark module 118, and a banner creation module 124. These sub-components and their functionalities are described below in detail. In some embodiments, the various components of the image generation system 100 are specialized sets of computer software instructions programmed onto a dedicated processor in the evaluation system 100 and can include specifically designated memory locations and/or registers for executing the specialized computer software instructions.

The database 108 is a computing device (or in some embodiments, a set of computing devices) that is coupled to and in communication with the image generation system 100 and is configured to provide, receive and store various types of data received and/or created for evaluating call agent performance. In some embodiments, all or a portion of the database 108 is integrated with the image generation system 100 or located on a separate computing device or devices. For example, the database 108 can comprise one or more databases, such as MySQL™ available from Oracle Corp. of Redwood City, California.

Figure 2:
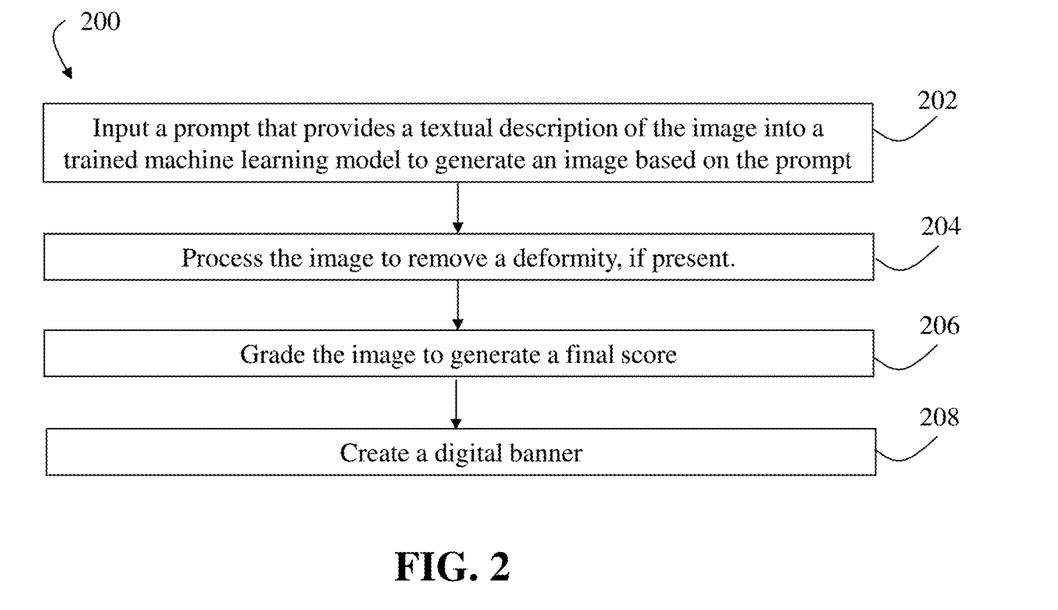
FIG. 2 shows an exemplary process utilized by the image generation system of FIG. 1 to generate a user-desired digital image, according to some embodiments of the present invention.

FIG. 2 shows an exemplary process 200 utilized by the image generation system 100 of FIG. 1 to generate a user-desired digital image, according to some embodiments of the present invention. The process 200 starts with the raw image generation module 114 of the image generation system 100 receiving, from a user, description of desired elements of a digital image. At step 202, the raw image generation module 114 is adapted to (i) create a customized prompt with a textual description of the digital image based on the desired elements and (ii) input the customized prompt into a trained machine learning model to generate the image. One exemplary customized prompt can be "Rock formations in shallow water, surrounded by cliffs." Another exemplary customized prompt can be "A middle-aged gentleman standing on a luxurious yacht." In some embodiments, the trained machine learning model is a stable diffusion model (e.g., a stable diffusion V1 or V2 model), which is a latent variable model based on the concept of Markov chains. Noise can be added at each time step of the model using a predefined function until the final latent space is mostly noise. The learnable part of the model is the conversion of that noise into an image using one or more up-sampling methods. In some embodiments, the trained machine learning model is a diffusion-derived custom model that is customized for a specific need, such as the need for realistic impressions. For example, the diffusion-derived custom model can be the Realistic Vision model (e.g., Realistic Vision V1 or V2 models) or the Paragon model (e.g., Paragon V1 model). Realistic Vision models are trained on realistic images (e.g., using the LIAON-5B dataset) to obtain a latent space that is optimized for creating realistic impressions. In some embodiments, shortcomings associated with the raw images generated from a trained machine learning model, such as a diffusion-based model, include deformities near eyes or nose areas or extra fingers or hands when the subject is a human being.

Figure 3:
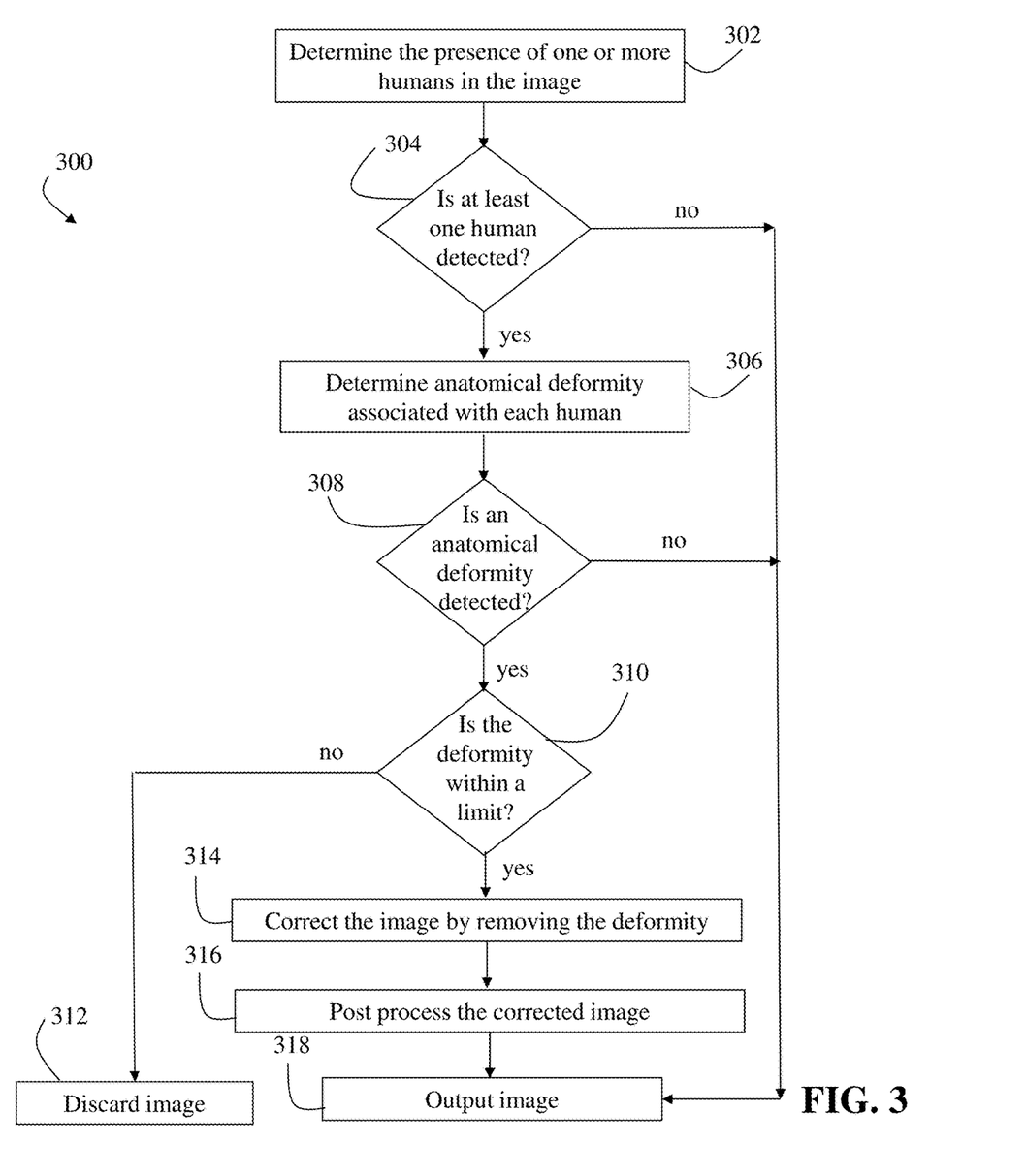
FIG. 3 shows an exemplary process implemented by the processing module of the image generation system of FIG. 1 to detect and correct deformities, according to some embodiments of the present invention.

At step 204, the processing module 116 of the image generation system 100 is configured to process the raw image from step 202 to correct for any deformities. FIG. 3 shows an exemplary process 300 implemented by the processing module 116 of the image generation system 100 to detect and correct deformities, according to some embodiments of the present invention. As shown, at step 302, the processing module 114 first determines the presence of one or more humans in the image by detecting one or more human faces using a face detection algorithm, such as FaceNet. In some embodiments, the face detection algorithm can also determine the focus center of the raw image.

At step 304, if at least one human face is detected, which is indicative of at least one human present in the image, the processing module 116 proceeds to determine, at step 306 whether there is at least one anatomical deformity associated with each of the detected human being. If at least one human face is detected, the processing module 116 can proceed to detect the hands of each human and determine if the anatomical deformity is present on a hand. To detect a hand, the processing module 116 can apply a trained machine-learning object detection model (e.g., a YOLO V.7 network model) to generate a bounding box around a portion of the image that is the detected hand. Next, the processing module 116 is adapted to classify the portion of the image in the bounding box to detect whether an anatomical deformity exists on the hand. Such classification can involve inputting the portion of the image in the bounding box to a convolutional neural network (CNN) trained for hand classification. For example, the CNN can be trained using a custom dataset comprising images of hands with extra fingers and other deformities (e.g., generated using a base image generator) merged with images of actual hands (e.g., from Kaggle). In general, the detection algorithm used at step 306 can detect deformities such as multiple hands, multiple fingers, deformed hands, etc. Alternatively, if no human face is detected at step 304, the processing module 116 is configured to output the original raw image (at step 318) without further processing.

At step 308, if at least one anatomical deformity is detected on an image involving one or more human beings, the processing module 116 is configured to perform correction of each detected anatomical deformity. Correction of an anatomical deformity can be accomplished by comparing each detected anatomical deformity with a predefined limit (step 310) and discarding the image if the deformity exceeds the limit (step 312), or automatically cropping the anatomical deformity from the image if the deformity is within the limit (step 314). More specifically, the coordinates of the bounding box within which the deformity is detected is used to determine the height of the bounding box, which is then compared to the predefined limit, e.g., 20% of the height of the raw image measured from the bottom edge of the image. If the height of the bounding box exceeds this 20% threshold, this means that the deformity is too large to be corrected and the entire image is discarded. However, if the height of the bounding box is within the 20% threshold, the anatomical deformity is removed by cropping the image at the coordinates of the bounding box. Alternatively, if no anatomical deformity is detected at step 308, the processing module 116 is configured to output the original raw image (at step 318) without further processing.

At step 314, if at least one anatomical deformity is cropped from an image involving one or more human being, the processing module 116 is configured to perform one or more postprocessing operations (step 316), such as center the image by obtaining the focus center of the human face in the image associated with the detected anatomical deformity and prune one or more sides of the image in proportion to a distance of the focus center from an actual image center to maintain image size proportions after the cropping. The focus center of the human face can be obtained using the face detection algorithm from step 302 when the presence of a human being in the image is detected. Other post processing operations that can be performed at step 316 including resizing the cropped image to the original dimensions of the raw image, further processing the image using an up-sampling algorithm to obtain super resolution, and/or fixing finer details such as the corner of the eyes and nose bridges. Finally, at step 318, the corrected image (or the original raw image if no correction is needed or no human face is detected) is outputted by the processing module 116 for utilization by one or more downstream applications.

Referring back to FIG. 2, at step 206, after a final image is generated from step 204, the benchmarking module 118 of the image generation system 100 is configured to grade the final image to generate a score for that image based on one or more individual scores including a first score measuring a contextual similarity between the image and a reference image, a second score measuring a similarity in color gradients between the image and the reference image, and a third score independently quantifying the quality of the image. In some embodiments, the reference image is selected by a designer from a repository of existing images (e.g., stored in database 108) that are deemed as acceptable for commercial usage, such as in advertisements. In some embodiments, the first score is generated by first using a trained GPT2 image captioning model to extract the contexts of both the final image and the reference image and then applying a cosine similarity algorithm to quantitatively measure the closeness of the two contexts. In some embodiments, the second score is generated by comparing pixel patches extracted from both the final image and the reference image and quantitively measure the similarity in color gradients based on a comparison of the two pixel patches. For example, a Learned Perceptual Image Patch Similarity (LPIPS) algorithm can be used to compute this score. In some embodiments, the third score is a Blind/Reference-less Image Spatial Quality Evaluator (BRISQUE) score generated by applying a BRISQUE algorithm on the final image upon color distribution (e.g., pixel distributions of natural images following a Gaussian bell curve). The BRISQUE score is adapted to measure how close the final image is to near real photographs. The final score can be a weighted average of the first, second and third scores. For example, the weights assigned to the first, second and third scores can be 0.45, 0.2 and 0.35, respectively. In some embodiments, the final score has a value of between 0 and 1, and the closer the final score is to 1, the closer the final image is to the reference image and/or life-like photography.

In some embodiments, steps 202-206 can be repeated to generate multiple images based on the same set of user image requirements. This can be achieved by inputting the same text prompt into the trained machine learning model multiple times to generate multiple images. Each of the multiple images can be corrected using the approach described above with respect to step 204 to correct for any anatomical deformities in the images. In addition, each image can be graded to generate a final score using the approach described above with respect to step 206. From these multiple images, the image generation system 100 can select the best image that has the highest final score generated.

At step 208 of process 200, the banner creation module 122 of the image generation system 100 is configured to create a digital banner that incorporates an image from step 206, such as the image with the highest final score. In some embodiments, the banner creation module 122 creates a banner based on three user inputs: (i) selection of a banner type, such as a banner used on different webpages or a mobile banner, (ii) texts for display in the body of the banner, including heading, subtext and/or addresses to hyperlinks, and (iii) configuration of the layout of the banner, including font size, column width ratio, font colors, etc. In some embodiments, the user is also allowed to choose the background colors of the banner, including standard color options or AI chosen colors by applying a spatial clustering algorithm on the selected image.

Figure 4:
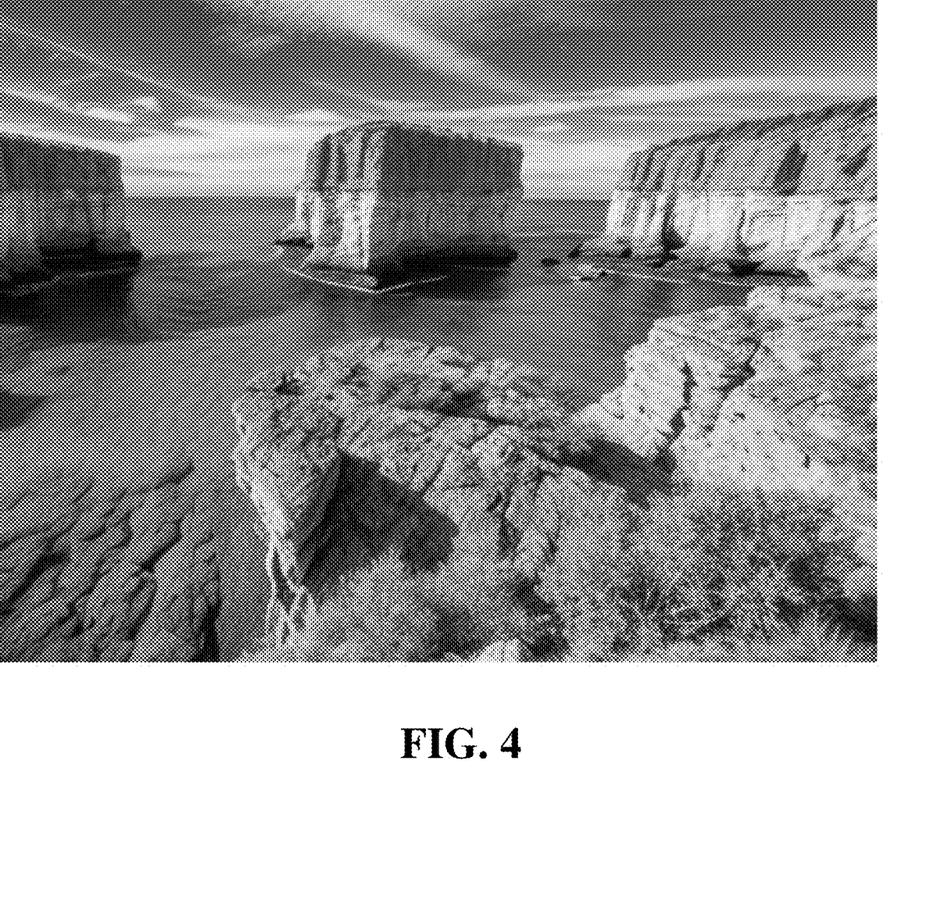
FIG. 4 shows an exemplary final image generated by the process of FIG. 2 based on a customized input prompt, accordingly to some embodiments of the present invention.

FIG. 4 shows an exemplary final image generated by process 200 of FIG. 2 based on a customized input prompt, accordingly to some embodiments of the present invention. More specifically, the image is generated using the input prompt "rock formations in shallow water, surrounded by cliffs." Using the scoring process described at step 206 of process 200, the benchmark module 122 of the image generation system 100 can compute a score of 0.5089 for this image to quantitatively measure the quality of the image.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

The invention claimed is:

1. A computer-implemented method for generating a digital image, the method comprising:
   inputting, by a computing device, a prompt that provides a textual description of the image into a trained machine learning model to generate the image based on the prompt;
   processing, by the computing device, the image comprising:
      determining, by the computing device, presence of one or more humans in the image by detecting one or more human faces using a face detection algorithm;
      if at least one human face is detected, which is indicative of at least one human present in the image, determining, by the computing device, whether there is at least one anatomical deformity associated with the at least one human; and
      if at least one anatomical deformity is detected, performing, by the computing device, correction of the at least one anatomical deformity by comparing the at least one anatomical deformity with a predefined limit and (i) discarding the image if the at least one deformity exceeds the limit, or (ii) automatically cropping the at least one anatomical deformity from the image if the at least one deformity is within the limit; and
   grading, by the computing device, the image to generate a final score based on a first score that measures a contextual similarity between the image and a reference image, a second score that measures a similarity in color gradients between the image and the reference image, and a third score that quantifies a quality of the image.

2. The computer-implemented method of claim 1, wherein the image is generated by the trained machine learning model using a stable diffusion pipeline.

3. The computer-implemented method of claim 1, wherein the at least one anatomical deformity is present on a hand of the at least one human detected.

4. The computer-implemented method of claim 3, wherein detecting the at least one anatomical deformity on the hand comprises:
   applying a trained machine-learning object detection model to detect the hand by generating a bounding box around a portion of the image that is the detected hand; and
   classifying the portion of the image in the bounding box to detect the at least one anatomical deformity, classifying the portion of the image comprises inputting the portion of the image in the bounding box to a convolutional neural network (CNN) trained for hand classification.

5. The computer-implemented method of claim 4, wherein automatically cropping the at least one anatomical deformity from the image comprises:
   determining coordinates of the at least one deformity based on the bounding box; and
   if the coordinates of the at least one anatomical deformity correlates to a height of the deformity of less than the predefined limit:
      cropping the at least one anatomical deformity at the coordinates;
      obtaining a focus center of the human face in the image associated with the at least one anatomical deformity using the face detection algorithm; and
      pruning one or more sides of the image in proportion to a distance of the focus center from an actual image center to maintain image size proportions after the cropping.

6. The computer-implemented method of claim 1, wherein the first score is generated by:
   using a trained image captioning model to extract contexts of both the image and the reference image; and
   using a cosine similarity technique to compare the extracted contexts.

7. The computer-implemented method of claim 1, wherein the second score is generated by comparing pixel patches in both the image and the reference image to determine the similarity of the color gradients.

8. The computer-implemented method of claim 1, wherein the third score is a Blind/Reference-less Image Spatial Quality Evaluator (BRISQUE) score generated using a BRISQUE algorithm based on pixel distributions of natural images following a Gaussian bell curve.

9. The computer-implemented method of claim 1, wherein the final score is a weighted average of the first, second and third scores.

10. The computer-implemented method of claim 1, further comprising:
generating multiple images by inputting the same text prompt into the trained machine learning model;
processing each of the multiple images to correct for any anatomical deformity;
generating a plurality of final scores for corresponding ones of the multiple images; and
selecting a final image from the multiple images, wherein the final image has a highest final score from the plurality of final scores generated.

11. The computer-implemented method of claim 10, further comprising creating a digital banner that comprises selecting a type of the banner, configuring textual content of the banner, and configuring layout of the banner to include the final image selected.

12. A computer-implemented system for generating a digital image, the computer-implemented system comprising a computing device having a memory for storing instructions, wherein the instructions, when executed, configure the computer-implemented system to provide:
an image generation module configured to input a prompt that provides a textual description of the image into a trained machine learning model to generate the image based on the prompt;
a processing module configured to:
determine presence of one or more humans in the image by detecting one or more human faces using a face detection algorithm;
if at least one human face is detected, which is indicative of at least one human present in the image, determine whether there is at least one anatomical deformity associated with the at least one human; and
if at least one anatomical deformity is detected, perform correction of the at least one anatomical deformity by comparing the at least one anatomical deformity with a predefined limit and (i) discarding the image if the at least one deformity exceeds the limit, or (ii) automatically cropping the at least one anatomical deformity from the image if the at least one deformity is within the limit; and
a benchmarking module configured to grade the image to generate a final score based on a first score that measures a contextual similarity between the image and a reference image, a second score that measures a similarity in color gradients between the image and the reference image, and a third score that independently quantifies a quality of the image.

13. The computer-implemented system of claim 12, wherein the at least one anatomical deformity is present on a hand of the at least one human detected.

14. The computer-implemented system of claim 13, wherein the processing module detects the at least one anatomical deformity on the hand by:
applying a trained machine-learning object detection model to detect the hand by generating a bounding box around a portion of the image that is the detected hand; and
classifying the portion of the image in the bounding box to detect the at least one anatomical deformity, classifying the portion of the image comprises inputting the portion of the image in the bounding box to a convolutional neural network (CNN) trained for hand classification.

15. The computer-implemented system of claim 14, wherein the processing module automatically crops the at least one anatomical deformity from the image by:
determining coordinates of the at least one deformity based on the bounding box; and
if the coordinates of the at least one anatomical deformity correlates to a height of the deformity of less than the predefined limit:
cropping the at least one anatomical deformity at the coordinates;
obtaining a focus center of the human face in the image associated with the at least one anatomical deformity using the face detection algorithm; and
pruning one or more sides of the image in proportion to a distance of the focus center from an actual image center to maintain image size proportions after the cropping.

16. The computer-implemented system of claim 12, wherein the benchmarking module generates the first score by:
using a trained image captioning model to extract contexts of both the image and the reference image; and
using a cosine similarity technique to compare the extracted contexts.

17. The computer-implemented system of claim 12, wherein the benchmarking module generates the second score by comparing pixel patches in both the image and the reference image to determine the similarity of the color gradients.

18. The computer-implemented system of claim 12, wherein the third score is a Blind/Reference-less Image Spatial Quality Evaluator (BRISQUE) score generated by the benchmarking module using a BRISQUE algorithm based on pixel distributions of natural images following a Gaussian bell curve.

19. The computer-implemented system of claim 12, further comprising a banner creation module configured to create a digital banner by selecting a type of the banner, configuring textual content of the banner, and configuring layout of the banner to include the image.

* * * * *